United States Patent
Chubach et al.

(10) Patent No.: US 11,343,539 B2
(45) Date of Patent: May 24, 2022

(54) METHOD AND APPARATUS OF LAST SIGNIFICANT COEFFICIENT CODING IN IMAGE AND VIDEO CODING

(71) Applicant: MediaTek Singapore Pte. Ltd., Singapore (SG)

(72) Inventors: Olena Chubach, San Jose, CA (US); Shih-Ta Hsiang, Hsinchu (TW); Mohammed Golam Sarwer, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/283,180

(22) PCT Filed: Oct. 8, 2019

(86) PCT No.: PCT/CN2019/109914
§ 371 (c)(1),
(2) Date: Apr. 6, 2021

(87) PCT Pub. No.: WO2020/073884
PCT Pub. Date: Apr. 16, 2020

(65) Prior Publication Data
US 2021/0314617 A1    Oct. 7, 2021

Related U.S. Application Data

(60) Provisional application No. 62/742,471, filed on Oct. 8, 2018.

(51) Int. Cl.
*H04N 19/61* (2014.01)
*H04N 19/70* (2014.01)
(Continued)

(52) U.S. Cl.
CPC .......... *H04N 19/61* (2014.11); *H04N 19/124* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | |
|---|---|---|
| 10,785,475 B2 | 9/2020 | Huang et al. |
| 10,931,974 B2 | 2/2021 | Su et al. |
| 2002/0021755 A1* | 2/2002 | Hourunranta .......... H04N 19/89 375/240.12 |

(Continued)

FOREIGN PATENT DOCUMENTS

| | | |
|---|---|---|
| CN | 107079165 A | 8/2017 |
| KR | 10-2015-0032277 A | 3/2015 |
| TW | 201820866 A | 6/2018 |

OTHER PUBLICATIONS

International Search Report and Written Opinion dated Dec. 27, 2019, issued in application No. PCT/CN2019/109914.
(Continued)

*Primary Examiner* — Mohammad J Rahman
(74) *Attorney, Agent, or Firm* — McClure, Qualey & Rodack, LLP (57) ABSTRACT

A method and apparatus for video encoding using improved last significant coefficient coding are disclosed. According to the present invention, a location of last significant coefficient in the transform block is encoded to generate one or more syntax elements and a maximum value of the syntax elements is dependent on a block size of the transform block and a zero-out threshold, where coefficients of the transform block with coordinates greater than the zero-out threshold
(Continued)

are set to zero. A method and apparatus for video decoding using improved last significant coefficient coding are also disclosed.

18 Claims, 5 Drawing Sheets

(51) Int. Cl.
*H04N 19/124* (2014.01)
*H04N 19/176* (2014.01)

(56) References Cited

U.S. PATENT DOCUMENTS

| | | | | |
|---|---|---|---|---|
| 2008/0123972 A1* | 5/2008 | Sekiguchi | ............. | H04N 19/70 382/232 |
| 2009/0327386 A1* | 12/2009 | Schoenblum | .......... | H04N 19/80 708/400 |
| 2010/0322303 A1* | 12/2010 | Wada | ..................... | H04N 19/61 375/240.01 |
| 2011/0134995 A1* | 6/2011 | An | ..................... | H04N 19/149 375/240.02 |
| 2012/0140813 A1 | 6/2012 | Sole Rojals et al. | | |
| 2013/0182757 A1* | 7/2013 | Karczewicz | ........... | H04N 19/13 375/240.02 |
| 2013/0188727 A1* | 7/2013 | Lou | ........................ | H04N 19/18 375/240.18 |
| 2013/0235925 A1* | 9/2013 | Nguyen | ............... | H04N 19/182 375/240.2 |
| 2013/0301738 A1* | 11/2013 | Kim | ..................... | H04N 19/156 375/240.18 |
| 2014/0003533 A1* | 1/2014 | He | ........................ | H04N 19/00 375/240.25 |
| 2015/0078432 A1 | 3/2015 | Wang et al. | | |
| 2017/0006309 A1* | 1/2017 | Liu | ........................ | H04N 19/96 |
| 2017/0324643 A1* | 11/2017 | Seregin | ................ | H04N 19/136 |
| 2018/0020218 A1* | 1/2018 | Zhao | .................... | H04N 19/103 |
| 2018/0070106 A1 | 3/2018 | Han et al. | | |
| 2020/0154140 A1* | 5/2020 | Ikai | ...................... | H04N 19/117 |
| 2020/0396486 A1* | 12/2020 | He | ......................... | H04N 19/61 |
| 2021/0211686 A1* | 7/2021 | Kirchhoffer | ......... | H04N 19/136 |

OTHER PUBLICATIONS

Chinese language office action dated Jan. 8, 2021, issued in application No. TW 108136379.

* cited by examiner

METHOD AND APPARATUS OF LAST SIGNIFICANT COEFFICIENT CODING IN IMAGE AND VIDEO CODING

CROSS REFERENCE TO RELATED PATENT APPLICATION(S)

The present invention claims priority to U.S. Provisional Patent Application, Ser. No. 62/742,471, filed on Oct. 8, 2018. The U.S. Provisional Patent Application is hereby incorporated by reference in its entirety.

TECHNICAL FIELD

The present invention relates to transform coefficient coding for image and video coding. In particular, the present invention discloses improved coding methods for last significant coefficients.

BACKGROUND

Adaptive Intra/Inter video coding has been widely used in various video coding standards, such as MPEG-2, AVC (advanced video coding) and HEVC (High Efficiency Video Coding). In adaptive Intra/Inter video coding, an input signal is predicted by Intra/Inter predictor to generate prediction residues. The residues are often processed by a two-dimensional transform and quantized. The quantized transform coefficients are then coded. The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A CTU can be further partitioned into multiple Coding Units (CUs) through Quad-Tree or Quadtree (QT) partitioning. The QT partition splits a block of size 4N×4N into 4 equal-size 2N×2N sub-blocks. The CTU can be a single CU (i.e., no splitting) or can be split into four smaller units of equal size, which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

According to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC.

After obtaining the residual block by the prediction process based on PU splitting type, the prediction residues of a CU can be partitioned into transform units (TU) according to another quadtree structure which is analogous to the coding tree for the CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

Figure 1:
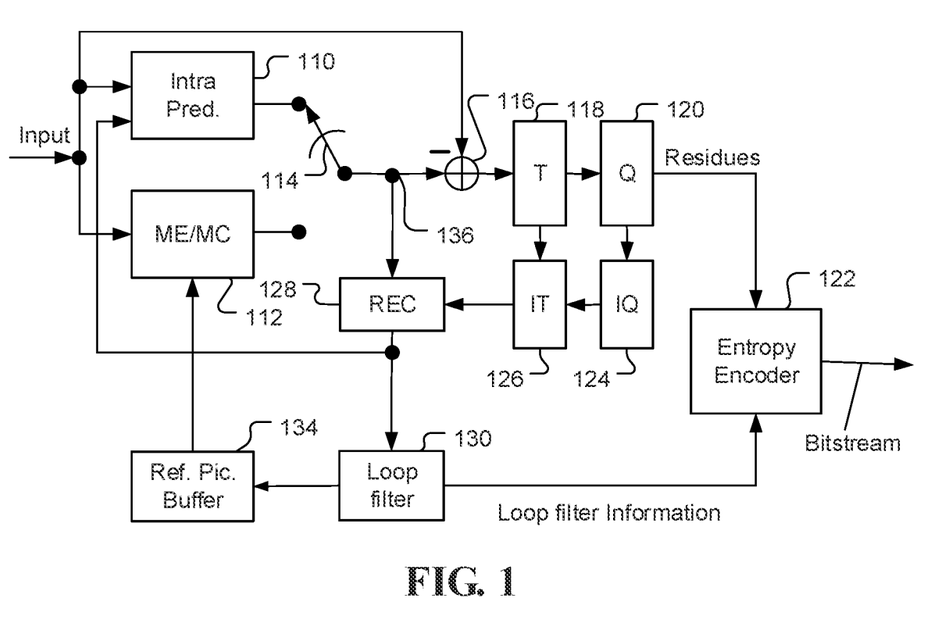
FIG. 1 illustrates an exemplary block diagram of a video encoder, where the video encoder incorporates Intra/Inter prediction, transform and quantization processes.

FIG. 1 illustrates an exemplary adaptive Inter/Intra video coding system incorporating transform and quantization to process prediction residues. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, de-blocking filter (DF) and Sample Adaptive Offset (SAO) have been used in the High Efficiency Video Coding (HEVC) standard. The loop filter may also include ALF (Adaptive Loop Filter). The loop filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system or H.264.

Figure 2:
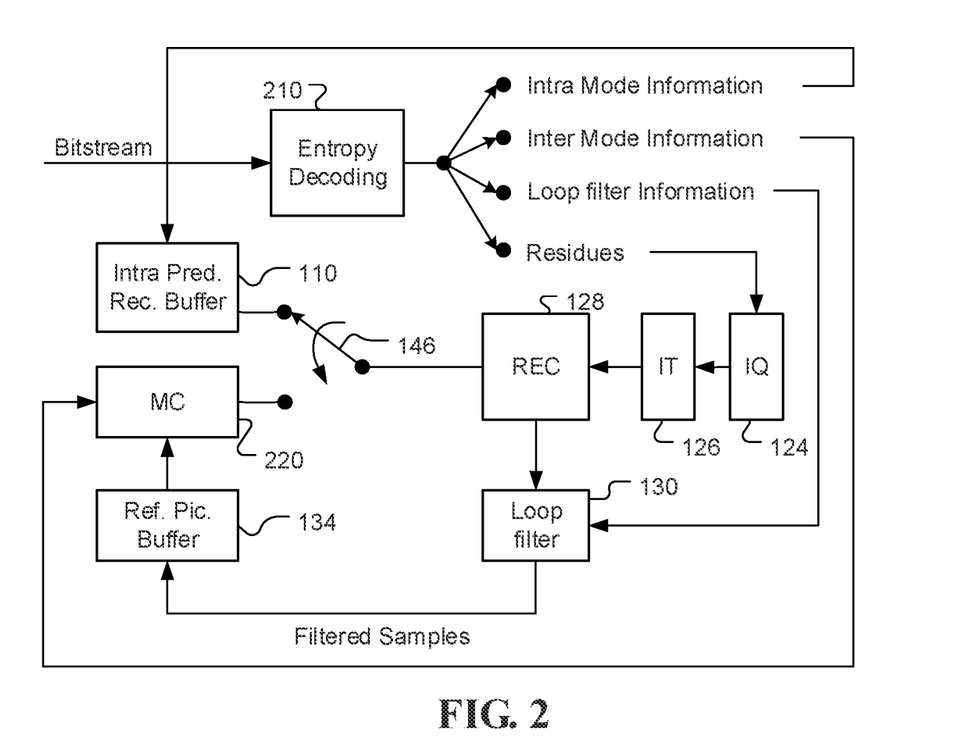
FIG. 2 illustrates an exemplary block diagram of a video decoder, where the video decoder incorporates Intra/Inter prediction, inverse transform and de-quantization processes.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

For entropy coding, it comes in various flavours. Variable length coding is a form of entropy coding that has been widely used for source coding. Usually, a variable length code (VLC) table is used for variable length encoding and decoding. Arithmetic coding is a newer entropy coding technique that can exploit the conditional probability using "context". Furthermore, arithmetic coding can adapt to the source statistics easily and provide higher compression efficiency than the variable length coding. While arithmetic coding is a high-efficiency entropy-coding tool and has been widely used in advanced video coding systems, the operations are more complicated than the variable length coding.

The Versatile Video Coding (VVC) is an emerging coding standard being developed under Joint Video Experts Team (JVET) of ITU-T. VVC utilizes more flexible block partition and also includes some new coding tools. For example, instead of quadtree-based block partition, VVC also takes into account of binary tree (BT) and ternary tree (TT).

Figure 3:
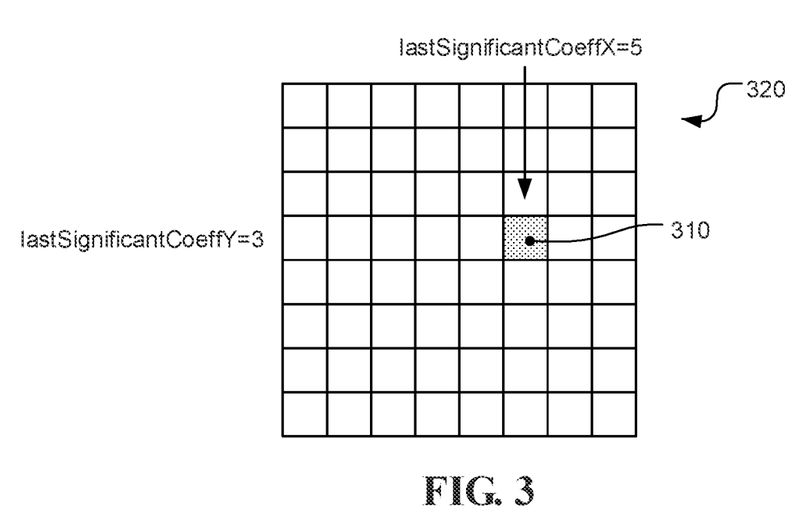
FIG. 3 illustrates an example of the location of the last significant coefficient.

For transform coefficients of residue signal, a residue block often contains a large number of zero-valued transform coefficients. In order to efficiently encode the transform coefficients, one technique involves identifying and signalling the location of the last non-zero quantized transform coefficient, which is also referred to as the last significant coefficient in a target transform block. In VVC Draft 2 (B. Bross, et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K1001), lastSignificantCoeff is the last coefficient in the transform block (TB) which is not equal to zero. The position of the lastSignificantCoeff is encoded for each TB. In particular, the horizontal (x) and vertical (y) position of the last non-zero coefficient of a CB (coding block) are coded with two syntax elements, lastSignificantCoeffX (horizontal coordinate) and lastSignificantCoeffY (vertical coordinate). FIG. 3 illustrates an example of lastSignificantCoeffX and lastSignificantCoeffY for a target block, where the last significant transform coefficient 310 in a target block 320 is shown.

Furthermore, each syntax element (i.e., lastSignificantCoeffX or lastSignificantCoeffY) is composed of prefix and suffix:

The prefixes, last_sig_coeff_x_prefix and last_sig_coeff_y_prefix, are both regular coded using truncated unary coding, and The suffixes, last_sig_coeff_x_suffix and last_sig_coeff_y_suffix, are both regular coded using fixed length coding.

The lastSignificantCoeffX can be derived as follows:

if last_sig_coeff_x_suffix is not present:

lastSignificantCoeffX=last_sig_coeff_x_prefix otherwise (last_sig_coeff_x_suffix is present):

lastSignificantCoeffX=(1<<((last_sig_coeff_x_prefix>>1)−1))*(2+(last_sig_coeff_x_prefix & 1))+last_sig_coeff_x_suffix.

Truncated unary binarization is the special case of truncated Rice (TR) binarization process with rice parameter cRiceParam=0. The residual coding semantics are described as follows:

last_sig_coeff_x_prefix specifies the prefix of the column position of the last significant coefficient in scanning order within a transform block. The values of last_sig_coeff_x_prefix shall be in the range of 0 to (log2TbWidth<<1)−1, inclusive.

last_sig_coeff_y_prefix specifies the prefix of the row position of the last significant coefficient in scanning order within a transform block. The values of last_sig_coeff_y_prefix shall be in the range of 0 to (log2TbHeight<<1)−1, inclusive.

In the above description, log2TbWidth and log2TbHeight are the logarithms of base 2 of transform block width and transform block height and defined as Log2(nTbW) and Log2(nTbH) respectively, where variable nTbW specifies the transform block width and variable nTbH specifies the transform block height.

In the evaluation software named VTM2.0.1 (VVC Test Model, version 2.0.1), the maximum TB size is 64×64 for luma and 32×32 for chroma. However, the maximum transformed residual block size (coefficients encoded) is smaller, because of zeroing out procedure applied:

coefficients of the TB with coordinates greater than the maximum transformed residual block size are all set to zero.

The max size of the residual block:

DCT2: max residual block size is 32×32

Non-DCT2: max residual block size is 16×16

The application of zero-out process for different block sizes are shown in Table 1 for DCT2 and Non-DCT2 transforms.

TABLE 1

|  | Length = 64 | Length = 32 | Length <= 16 |
| --- | --- | --- | --- |
| DCT2 | 32-py zero-out | No zero-out | No zero-out |
| Non-DCT2 | Not valid | 32-py zero-out | No zero-out |

In VTM2.0.1, in order to reduce the computation of the transform, the very high frequency components of the large transform block are set to zero. There is a parameter, called iZeroOutThresh, which controls what coefficients are set to zero. Assume that (x, y) is the column and row position of a transform block, and T(x, y) is the transform coefficient of (x, y) position. The zero-out process is shown as follows:

If (x>=iZeroOutThresh||y>=iZeroOutThresh), then T(x, y) is set to zero.

In the present invention, coding techniques of last significant coefficient with improved performance are disclosed.

SUMMARY

A method and apparatus for video encoding are disclosed. According to the present invention, input data related to a current block in a current picture are received at a video encoder side. Residue signals for the current block are derived. A transform process and a quantization process to the residue signals to generate a transform block. A location of last significant coefficient in the transform block is encoded to generate one or more syntax elements, where a maximum value of said one or more syntax elements is dependent on a block size of the transform block and a zero-out threshold, and coefficients of the transform block with coordinates greater than the zero-out threshold are set to zero. Encoded data comprising said one or more syntax elements are then generated.

In one embodiment, the syntax elements comprise a prefix for x-location of the last significant coefficient, and the maximum value of the prefix for the x-location of the last significant coefficient is dependent on a width of the transform block and the zero-out threshold. Furthermore, a parameter, Log2maxX can be defined as (Log2 (nTbW>iZeroOutThresh?iZeroOutThresh:nTbW)) and the maximum value of the prefix for the x-location of the last significant coefficient is derived as ((Log2maxX<<1)−1), where Log2( ) corresponds to a log-based-2 operation, iZeroOutThresh corresponds to the zero-out threshold, nTbW corresponds to the width of the transform block, and "<<" corresponds to a left-shift operation.

In another embodiment, syntax elements comprise a prefix for y-location of the last significant coefficient, and the maximum value of the prefix for the y-location of the last significant coefficient is dependent on a height of the transform block and the zero-out threshold. Furthermore, a parameter, Log2maxY can be defined as (Log2 (nTbH>iZeroOutThresh?iZeroOutThresh:nTbH)) and the maximum value of the prefix for the y-location of the last significant coefficient is derived as ((Log2maxY<<1)−1), and nTbH corresponds to the height of the transform block.

In yet another embodiment, the syntax elements comprise a prefix for x-location of the last significant coefficient and a prefix for y-location of the last significant coefficient, and the maximum value of the prefix for the x-location of the last significant coefficient is dependent on a width of the transform block and the zero-out threshold and the maximum value of the prefix for the y-location of the last significant coefficient is dependent on a height of the transform block and the zero-out threshold. Derivation of the maximum value of the prefix for the x-location of the last significant coefficient and the maximum value of the prefix for the y-location of the last significant coefficient shown above can be applied in this embodiment.

In one embodiment, the prefix for x-location of the last significant coefficient is coded depending on the prefix for y-location of the last significant coefficient, or the prefix for y-location of the last significant coefficient is coded depending on the prefix for x-location of the last significant coefficient.

In another embodiment, the prefix for x-location of the last significant coefficient is coded using the prefix for y-location of the last significant coefficient as a predictor, or the prefix for y-location of the last significant coefficient is coded using the prefix for x-location of the last significant coefficient as the predictor.

In one embodiment, the zero-out threshold is pre-defined and known to both an encoder and a decoder. In another embodiment, the zero-out threshold is signalled in a bitstream. For example, the zero-out threshold can be signalled in an SPS (sequence parameter set) of the bitstream. In yet another embodiment, the zero-out threshold is signalled for a vertical direction and a horizontal direction respectively. In yet another embodiment, different zero-out thresholds are used for different transform block sizes.

In one embodiment, when non-DCT-II transform is applied in horizontal and/or vertical directions of a residual block, the zero-out threshold, iZeroOutThresh can be updated to iZeroOutThresh>>k, where k is an integer greater than 0, and wherein ">>" corresponds to a right-shift operation. For example, k can be equal to 1.

A similar method for the decoder side is also disclosed. According to this method, a video bitstream corresponding to compressed data including a current block in a current picture is received at a video decoder side. One or more syntax elements related to location of last significant coefficient in a transform block within the current block are parsed from the video bitstream, where a maximum value of said one or more syntax elements is dependent on a block size of the transform block and a zero-out threshold, and coefficients of the transform block with coordinates greater than the zero-out threshold are set to zero. Decoded residue signals for the current block are derived using first information comprising the location of last significant coefficient in the transform block. A reconstructed current block is generated using second information comprising the decoded residue signals for the current block.

DETAILED DESCRIPTION OF PREFERRED IMPLEMENTATIONS

The following description is of the best-contemplated mode of carrying out the invention. This description is made for the purpose of illustrating the general principles of the invention and should not be taken in a limiting sense. The scope of the invention is best determined by reference to the appended claims.

In the present invention, methods for improving the coding efficiency of the last significant coefficient are disclosed. According to the present invention, encoding of last_sig_coeff_x_prefix and last_sig_coeff_y_prefix takes into account of the block size as well as the zero out threshold. In one embodiment, the maximum value of last_sig_coeff_x_prefix depends on the width of the transform block (TB) as well as the zero out threshold iZeroOutThresh. For example, the maximum value of last_sig_coeff_x_prefix is derived according to the following pseudo-code:

Log2maxX=Log2 (nTbW>iZeroOutThresh?iZeroOutThresh:nTbW);

Max value of last_sig_coeff_x_prefix=(Log2maxX<<1)−1.

In the above equations, the logical operator (x?y:z) means if x is TRUE or not equal to 0, evaluates to the value of y;

otherwise, evaluates to the value of z. Similarly, the maximum value of last_sig_coeff_y_prefix depends on the height of the block as well as the zero out threshold iZeroOutThresh. The maximum value of last_sig_coeff_y_prefix is derived according to the following pseudo-code:

Log2maxY=Log2
(nTbH>iZeroOutThresh?iZeroOutThresh:nTbH);
Max value of last_sig_coeff_y_prefix=(Log2maxY<<1)−1.

In another embodiment, the maximum value of last_sig_coeff_x_prefix is same as VTM2.0. However, the maximum value of last_sig_coeff_y_prefix not only depends on the height of the block but also depends on the zero out threshold iZeroOutThresh. The maximum value of last_sig_coeff_y_prefix is derived by using following pseudo-code:

Log2maxY=Log2
(nTbH>iZeroOutThresh?iZeroOutThresh:nTbH);
Max value of last_sig_coeff_y_prefix=(Log2maxY<<1)−1.

In yet another embodiment, the maximum value of last_sig_coeff_y_prefix is same as VTM2.0.1. However, the maximum value of last_sig_coeff_x_prefix not only depends on the width of the block but also depends on the zero out threshold iZeroOutThresh. The maximum value of last_sig_coeff_x_prefix is derived according to the following pseudo-code:

Log2maxX=Log2
(nTbW>iZeroOutThresh?iZeroOutThresh:nTbW);
Max value of last_sig_coeff_x_prefix=(Log2maxX<<1)−1.

This present invention also discloses that the maximum value of last_sig_coeff_x_prefix and last_sig_coeff_y_prefix depend on the zero out threshold iZeroOutThresh only if certain conditions are satisfied. An embodiment is shown as follows:

If transform is not applied in the TB, the last_sig_coeff_x_prefix and last_sig_coeff_y_prefix do not depend on the zero out threshold and maximum values are same as VTM2.0.1.

Otherwise, last_sig_coeff_x_prefix and last_sig_coeff_y_prefix depends on the zero-out threshold as described in earlier.

In one embodiment, the value of iZeroOutThresh is predefined (e.g. 32) and known to both encoder and decoder.

In another embodiment, the value of iZeroOutThresh can be any value from 0 to maximum size of the transform block and the value of iZeroOutThresh is signalled to the decoder through a higher level syntax such as SPS syntax element.

In some embodiments, different values of iZeroOutThresh can be signalled for horizontal and vertical directions, respectively. In some other embodiments, different values of iZeroOutThresh can be signalled for different transform types. In one embodiment, the value of iZeroOutThresh may also depend on the transform type applied to the transform block in horizontal and/or vertical directions. In one embodiment, when non-DCT-II transform is applied in horizontal and/or vertical directions of the residual block, the value of iZeroOutThresh is updated to iZeroOutThresh>>k for that direction. For example, k is equal to 1.

In one embodiment, last_sig_coeff_y_prefix may be coded depending on the value of last_sig_coeff_x_prefix. In one embodiment, last_sig_coeff_x_prefix may be used as predictor for coding last_sig_coeff_y_prefix. In one embodiment, last_sig_coeff_x_prefix may be coded depending on the value of last_sig_coeff_y_prefix. In one embodiment, last_sig_coeff_y_prefix may be used as predictor for coding last_sig_coeff_x_prefix.

Figure 4:
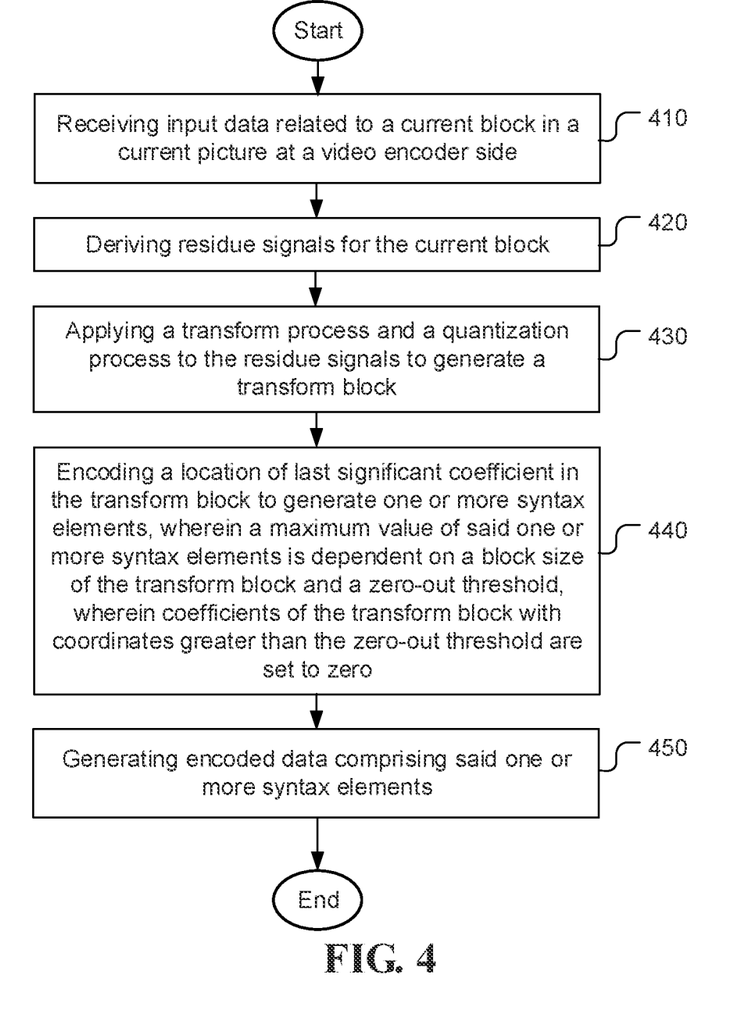
FIG. 4 illustrates a flowchart of an exemplary encoding system using improved coding of location of the last significant coefficient according to an embodiment of the present invention.

The present invention can be applied to a video encoder. In particular, the present invention can be applied to the residue signals generated from the Intra/Inter prediction process. FIG. 4 illustrates a flowchart of an exemplary encoding system using improved coding of location of the last significant coefficient according to an embodiment of the present invention. The steps shown in the flowchart may be implemented as program codes executable on one or more processors (e.g., one or more CPUs) at the encoder side. The steps shown in the flowchart may also be implemented based on hardware such as one or more electronic devices or processors arranged to perform the steps in the flowchart. According to this method, input data associated with a current block in an image are received in step 410. Residue signals for the current block are derived in step 420. A transform process and a quantization process are applied to the residue signals to generate a transform block in step 430. A location of last significant coefficient in the transform block is encoded to generate one or more syntax elements in step 440, where a maximum value of said one or more syntax elements is dependent on a block size of the transform block and a zero-out threshold, and coefficients of the transform block with coordinates greater than the zero-out threshold are set to zero. Encoded data comprising said one or more syntax elements are generated in step 450.

Figure 5:
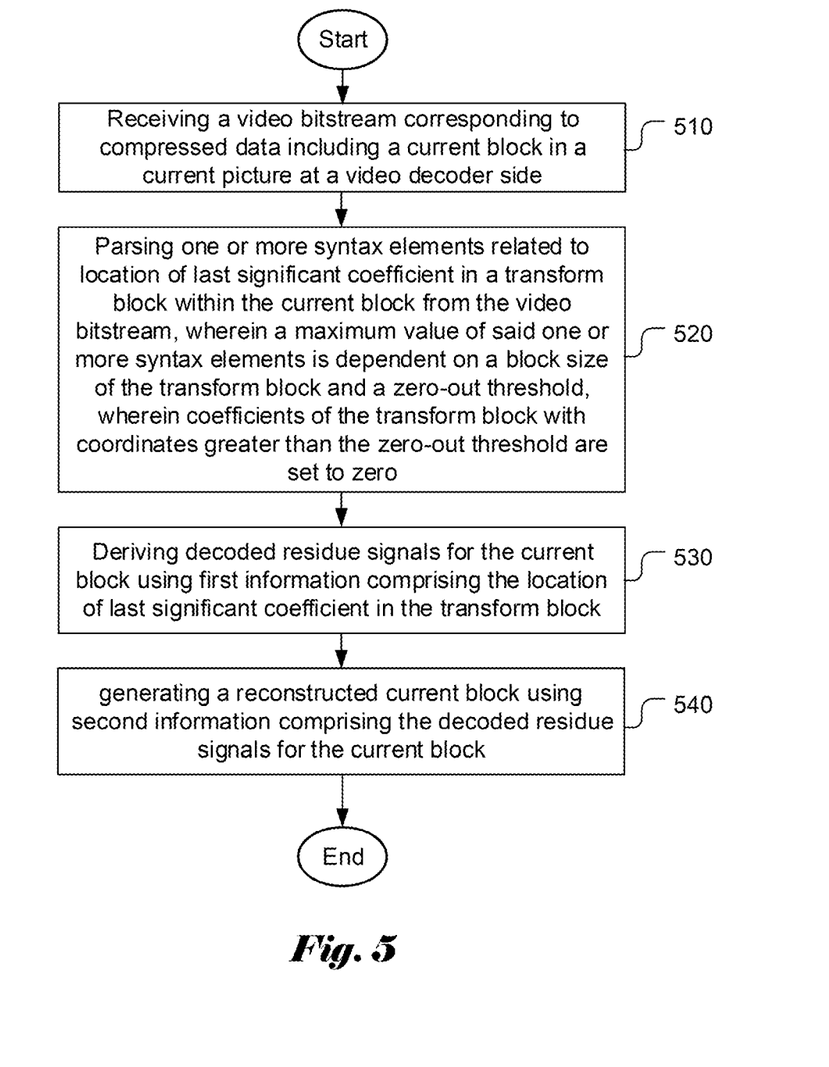
FIG. 5 illustrates a flowchart of an exemplary decoding system using improved coding of location of the last significant coefficient according to an embodiment of the present invention.

The present invention can be applied to a video decoder. In particular, the present invention can be applied to the coded residue signals. FIG. 5 illustrates a flowchart of an exemplary decoding system using improved coding of location of the last significant coefficient according to an embodiment of the present invention. A video bitstream corresponding to compressed data including a current block in a current picture is received at a video decoder side in step 510. One or more syntax elements related to location of last significant coefficient in a transform block within the current block are parsed from the video bitstream in step 520, where a maximum value of said one or more syntax elements is dependent on a block size of the transform block and a zero-out threshold, and coefficients of the transform block with coordinates greater than the zero-out threshold are set to zero. Decoded residue signals for the current block are generated using first information comprising the location of last significant coefficient in the transform block in step 530. A reconstructed current block is generated using second information comprising the decoded residue signals for the current block in step 540.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding, the method comprising:
receiving input data related to a current block in a current picture at a video encoder side;
deriving residue signals for the current block;
applying a transform process and a quantization process to the residue signals to generate a transform block;
encoding a location of last significant coefficient in the transform block to generate one or more syntax elements, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for x-location of the last significant coefficient, and the maximum value of the prefix for the x-location of the last significant coefficient is dependent on a width of the transform block and the zero-out threshold, and wherein Log2maxX is defined as (Log2(nTbW>iZeroOutThresh?iZeroOutThresh:nTbW)) and the maximum value of the prefix for the x-location of the last significant coefficient is derived as ((Log2maxX<<1)−1), and wherein Log2( ) corresponds to a log-based-2 operation, iZeroOutThresh corresponds to the zero-out threshold, nTbW corresponds to the width of the transform block, and "<<" corresponds to a left-shift operation; and
generating encoded data comprising said one or more syntax elements.

2. A method of video decoding, the method comprising:
receiving a video bitstream corresponding to compressed data including a current block in a current picture at a video decoder side;
parsing one or more syntax elements related to location of last significant coefficient in a transform block within the current block from the video bitstream, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for x-location of the last significant coefficient, and the maximum value of the prefix for the x-location of the last significant coefficient is dependent on a width of the transform block and the zero-out threshold, and wherein Log2maxX is defined as (Log2(nTbW>iZeroOutThresh?iZeroOutThresh:nTbW)) and the maximum value of the prefix for the x-location of the last significant coefficient is derived as ((Log2maxX<<1)−1), and wherein Log2( ) corresponds to a log-based-2 operation, iZeroOutThresh corresponds to the zero-out threshold, nTbW corresponds to the width of the transform block, and "<<" corresponds to a left-shift operation;
deriving decoded residue signals for the current block using first information comprising the location of last significant coefficient in the transform block; and
generating a reconstructed current block using second information comprising the decoded residue signals for the current block.

3. The method of claim 2, wherein said one or more syntax elements comprise a prefix for y-location of the last significant coefficient, and the maximum value of the prefix for the y-location of the last significant coefficient is dependent on a height of the transform block and the zero-out threshold.

4. The method of claim 3, wherein Log2maxY is defined as (Log2maxY=Log2(nTbH>iZeroOutThresh?iZeroOutThresh:nTbH)) and the maximum value of the prefix for the y-location of the last significant coefficient is derived as ((Log2maxY<<1)−1), and wherein Log2( ) corresponds to a log-based-2 operation, iZeroOutThresh corresponds to the zero-out threshold, nTbH corresponds to the height of the transform block, and "<<" corresponds to a left-shift operation.

5. The method of claim 2, wherein said one or more syntax elements comprise a prefix for x-location of the last significant coefficient and a prefix for y-location of the last significant coefficient, and the maximum value of the prefix for the x-location of the last significant coefficient is dependent on a width of the transform block and the zero-out threshold and the maximum value of the prefix for the y-location of the last significant coefficient is dependent on a height of the transform block and the zero-out threshold.

6. The method of claim 5, wherein Log2maxX is defined as (Log2(nTbW>iZeroOutThresh?iZeroOutThresh:nTbW)) and the maximum value of the prefix for the x-location of the last significant coefficient is derived as ((Log2maxX<<1)−1); Log2maxX is defined as (Log2(nTbH>iZeroOutThresh?iZeroOutThresh:nTbH)) and the maximum value of the prefix for the y-location of the last significant coefficient is derived as ((Log2maxY<<1)−1); and wherein Log2( ) corresponds to a log-based-2 operation, iZeroOutThresh corresponds to the zero-out threshold, nTbW corresponds to the width of the transform block, nTbH corresponds to the height of the transform block, and "<<" corresponds to a left-shift operation.

7. The method of claim 5, wherein the prefix for x-location of the last significant coefficient is coded depending on the prefix for y-location of the last significant coefficient, or the prefix for y-location of the last significant coefficient is coded depending on the prefix for x-location of the last significant coefficient.

8. The method of claim 5, wherein the prefix for x-location of the last significant coefficient is coded using the prefix for y-location of the last significant coefficient as a predictor, or the prefix for y-location of the last significant coefficient is coded using the prefix for x-location of the last significant coefficient as the predictor.

9. The method of claim 2, wherein the zero-out threshold is pre-defined and known to both an encoder and a decoder.

10. The method of claim 2, wherein the zero-out threshold is signalled in a bitstream.

11. The method of claim 10, wherein the zero-out threshold is signalled in an SPS (sequence parameter set) of a bitstream.

12. The method of claim 2, wherein the zero-out threshold is signalled for a vertical direction and a horizontal direction respectively.

13. The method of claim 2, wherein different zero-out thresholds are used for different transform block sizes.

14. The method of claim 2, wherein when non-DCT-II transform is applied in horizontal and/or vertical directions of a residual block, the zero-out threshold, iZeroOutThresh is updated to iZeroOutThresh>>k, where k is an integer greater than 0, and wherein ">>" corresponds to a right-shift operation.

15. An apparatus of video decoding, the apparatus comprising one or more electronic circuits or processors arranged to:
receive a video bitstream corresponding to compressed data including a current block in a current picture at a video decoder side;
parse one or more syntax elements related to location of last significant coefficient in a transform block within the current block from the video bitstream, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for x-location of the last significant coefficient, and the maximum value of the prefix for the x-location of the last significant coefficient is dependent on a width of the transform block and the zero-out threshold, and wherein Log2maxX is defined as (Log2 (nTbW>iZeroOutThresh?iZeroOutThresh:nTbW)) and the maximum value of the prefix for the x-location of the last significant coefficient is derived as ((Log2maxX<<1)−1), and wherein Log2( ) corresponds to a log-based-2 operation, iZeroOutThresh corresponds to the zero-out threshold, nTbW corresponds to the width of the transform block, and "<<" corresponds to a left-shift operation;
derive decoded residue signals for the current block using first information comprising the location of last significant coefficient in the transform block; and
generate a reconstructed current block using second information comprising the decoded residue signals for the current block.

16. A method of video encoding, the method comprising:
receiving input data related to a current block in a current picture at a video encoder side;
deriving residue signals for the current block;
applying a transform process and a quantization process to the residue signals to generate a transform block;
encoding a location of last significant coefficient in the transform block to generate one or more syntax elements, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for y-location of the last significant coefficient, and the maximum value of the prefix for the y-location of the last significant coefficient is dependent on a height of the transform block and the zero-out threshold, and wherein Log2maxY is defined as (Log2maxY=Log2 (nTbH>iZeroOutThresh?iZeroOutThresh:nTbH)) and the maximum value of the prefix for the y-location of the last significant coefficient is derived as ((Log2maxY<<1)−1), and wherein Log2( ) corresponds to a log-based-2 operation, iZeroOutThresh corresponds to the zero-out threshold, nTbH corresponds to the height of the transform block, and "<<" corresponds to a left-shift operation; and
generating encoded data comprising said one or more syntax elements.

17. A method of video decoding, the method comprising:
receiving a video bitstream corresponding to compressed data including a current block in a current picture at a video decoder side;
parsing one or more syntax elements related to location of last significant coefficient in a transform block within the current block from the video bitstream, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for y-location of the last significant coefficient, and the maximum value of the prefix for the y-location of the last significant coefficient is dependent on a height of the transform block and the zero-out threshold, and wherein Log2maxY is defined as (Log2maxY=Log2 (nTbH>iZeroOutThresh?iZeroOutThresh:nTbH)) and the maximum value of the prefix for the y-location of the last significant coefficient is derived as ((Log2maxY<<1)−1), and wherein Log2( ) corresponds to a log-based-2 operation, iZeroOutThresh corresponds to the zero-out threshold, nTbH corresponds to the height of the transform block, and "<<" corresponds to a left-shift operation;
deriving decoded residue signals for the current block using first information comprising the location of last significant coefficient in the transform block; and
generating a reconstructed current block using second information comprising the decoded residue signals for the current block.

18. An apparatus of video decoding, the apparatus comprising one or more electronic circuits or processors arranged to:
  receive a video bitstream corresponding to compressed data including a current block in a current picture at a video decoder side;
  parse one or more syntax elements related to location of last significant coefficient in a transform block within the current block from the video bitstream, wherein a maximum value of said one or more syntax elements is dependent on a block size of the transform block and a zero-out threshold, wherein coefficients of the transform block with coordinates greater than the zero-out threshold are set to zero, wherein said one or more syntax elements comprise a prefix for y-location of the last significant coefficient, and the maximum value of the prefix for the y-location of the last significant coefficient is dependent on a height of the transform block and the zero-out threshold, and wherein Log2maxY is defined as (Log2maxY=Log2(nTbH>iZeroOutThresh?iZeroOutThresh:nTbH)) and the maximum value of the prefix for the y-location of the last significant coefficient is derived as ((Log2maxY<<1)−1), and wherein Log2( ) corresponds to a log-based-2 operation, iZeroOutThresh corresponds to the zero-out threshold, nTbH corresponds to the height of the transform block, and "<<" corresponds to a left-shift operation;
  derive decoded residue signals for the current block using first information comprising the location of last significant coefficient in the transform block; and
  generate a reconstructed current block using second information comprising the decoded residue signals for the current block.

* * * * *